US008861843B2

(12) United States Patent
Kitajima

(10) Patent No.: US 8,861,843 B2
(45) Date of Patent: Oct. 14, 2014

(54) IMAGE PROCESSING APPARATUS, IMAGE PROCESSING METHOD AND PROGRAM

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 544 days.

(21) Appl. No.: 12/956,743

(22) Filed: Nov. 30, 2010

(65) Prior Publication Data

US 2011/0158513 A1 Jun. 30, 2011

(30) Foreign Application Priority Data

Dec. 25, 2009 (JP) ................................. 2009-295511

(51) Int. Cl.
| | |
|---|---|
| *G06K 9/00* | (2006.01) |
| *G06K 9/46* | (2006.01) |
| *G06K 9/66* | (2006.01) |
| *H04N 5/232* | (2006.01) |
| *H04N 9/73* | (2006.01) |
| *G06T 7/40* | (2006.01) |
| *H04N 9/64* | (2006.01) |

(52) U.S. Cl.
CPC ........ *H04N 5/23219* (2013.01); *G06K 9/00684* (2013.01); *G06T 2207/20021* (2013.01); *H04N 9/735* (2013.01); *G06T 7/408* (2013.01); *H04N 9/643* (2013.01); *G06T 2207/60201* (2013.01)
USPC .......................................... 382/162; 382/195

(58) Field of Classification Search
USPC .......................................... 382/162, 190, 195
See application file for complete search history.

(56) References Cited

U.S. PATENT DOCUMENTS

| | | | | |
|---|---|---|---|---|
| 5,949,962 | A | * | 9/1999 | Suzuki et al. ................... 358/1.9 |
| 7,548,357 | B2 | | 6/2009 | Moriya ......................... 358/520 |
| 7,620,242 | B2 | * | 11/2009 | Enomoto et al. .............. 382/167 |
| 7,916,158 | B2 | | 3/2011 | Aoki et al. |
| 2007/0115371 | A1 | | 5/2007 | Enomoto et al. |
| 2007/0297649 | A1 | | 12/2007 | Nakanishi |
| 2009/0303336 | A1 | * | 12/2009 | Utsugi ....................... 348/222.1 |

FOREIGN PATENT DOCUMENTS

| | | |
|---|---|---|
| CN | 1856117 A | 11/2006 |
| CN | 1890688 A | 1/2007 |

(Continued)

OTHER PUBLICATIONS

Chinese Office Action issued on Dec. 13, 2012, in Chinese application No. 201010621010.9.

(Continued)

*Primary Examiner* — Bernard Krasnic
(74) *Attorney, Agent, or Firm* — Fitzpatrick, Cella, Harper & Scinto

(57) ABSTRACT

The chroma of each block is calculated from color difference signals to calculate the number of blocks having chroma equal to or greater than a predetermined threshold from among the blocks that are not part of a detected face area, and to calculate a high-chroma block ratio of the high-chroma blocks (having their chroma equal to or greater than the predetermined threshold), to the number of blocks that are not in the face area. If the average chroma and the high-chroma block ratio match or exceed predetermined values, the scene is discriminated as a vivid color scene. The threshold of the criterion of the high-chroma block ratio is made to be small, if the scene has been discriminated as a vivid color scene in the past, while if the scene has not been discriminated as being such a scene, the threshold is made to be large.

14 Claims, 11 Drawing Sheets

(56) References Cited

FOREIGN PATENT DOCUMENTS

| | | |
|---|---|---|
| JP | 03-211988 A | 9/1991 |
| JP | 2000259372 | 9/2000 |
| JP | 2002-281327 A | 9/2002 |
| JP | 2005-204136 A | 7/2005 |
| JP | 2006-262000 A | 9/2006 |
| JP | 2009-164838 A | 7/2009 |

OTHER PUBLICATIONS

Office Action Chinese Patent Appln. No. 201010621010.9, The State Intellectual Property Office of the P.R. China, Aug. 30, 2013.

* cited by examiner

401

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method, and a program, and more particularly to a technique suitably usable for performing image processing of a scene including a vivid object.

2. Description of the Related Art

An image processing apparatus discriminating the scene of an image and the type of an object to perform image processing corresponding to the discriminated type of the object of the scene has conventionally been known. For example, Japanese Patent Application Laid-Open No. 2000-259372 discloses an image output apparatus discriminating whether an input image is a scene including a vivid object (hereinafter referred to as vivid color scene) or not, and outputting the input image with high resolution for the vivid image.

The technique disclosed in Japanese Patent Application Laid-Open 2000-259372 discriminates whether a scene is the vivid color scene or not on the basis of whether the number of high chroma pixels is larger than a predetermined number or not. As examples of the vivid color scene, here, there can be a scene having a vivid background and a scene having a vivid principal object (main object). Between them, the distribution of high chroma pixels in the vivid background scene varies depending on the existence of a main object, such as a person, which is not included in other than the background, and for example, if a person is included in the scene, the number of high chroma pixels decreases due to existence of the image of the person. Accordingly, the image output apparatus described in Japanese Patent Application Laid-Open 2000-259372 has the problem that it is difficult to discriminate an image which included therein a main object and a vivid background scene, as a vivid color scene and therefore it is impossible to suitably discriminate such an image and output the image with high resolution scene.

In view of the foregoing, it is an aspect of the invention to attain performing appropriate image processing to an image including a vivid color scene, independently of whether an input image includes a main object therein or not.

SUMMARY OF THE INVENTION

In order to attain the object of the invention, an image processing apparatus of the present invention comprising: a calculation unit configured to calculate an evaluation value including at least chroma information on the basis of an input image signal; a detection unit configured to detect a main object area from the input image signal; a discrimination unit configured to discriminate whether an image represented by the input image signal is a vivid color scene or not, on the basis of the evaluation value calculated by the calculation unit; and an output unit configured to output a result of a discrimination by the discrimination unit, wherein the discrimination unit lowers a weighting factor of the evaluation value of the main object area detected by the detection unit, to perform discrimination.

According to the present invention, a vivid color scene can be discriminated independently of whether any main object is included in an input image or not. Thereby, appropriate image processing can be performed to any image including what a kind of vivid color scene.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

In the following, an image pickup apparatus according to a first embodiment of the present invention will be described with reference to FIGS. 1 to 8B.

Figure 1:
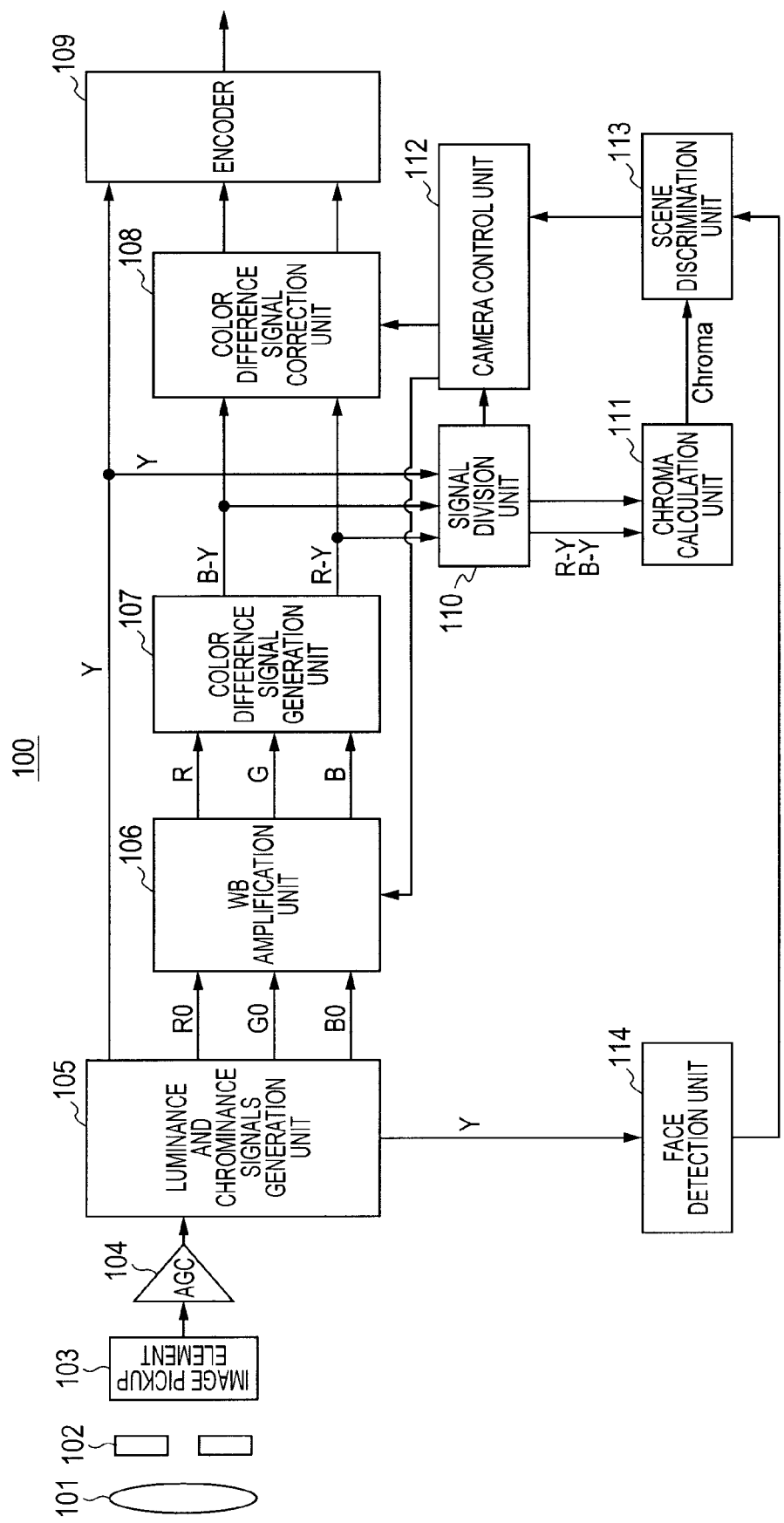
FIG. 1 is a block diagram illustrating a configuration example of an image pickup apparatus according to a first embodiment.

FIG. 1 is a block diagram illustrating a configuration example of an image pickup apparatus having the function of detecting a scene of a photographed image and performing image correction processing according to the detected scene in the present embodiment.

In FIG. 1, a lens 101 forms an object image from an object light, and an image pickup element 103 photoelectrically converts the light entering the image pickup element 103 through the lens 101 and an iris 102. An automatic gain control (AGC) amplifier 104 amplifies a signal output from the image pickup element 103 to an appropriate level.

An luminance and chrominance signal generation unit 105 converts a signal generated by the image pickup element 103 into a luminance signal (Y) and chrominance signals (R0, G0, B0). A white balance amplification unit 106 amplifies the chrominance signals (R0, G0, B0) output from the luminance and chrominance signal generation unit 105 in accordance with a white balance gain to generate amplified chrominance signals (R, G, B). A color difference signal generation unit 107 generates color difference signals (R−Y, B−Y). A color difference signal correction unit 108 performs the correction of a color difference signal, such as multiplying the signal by a gain. An encoder 109 converts an input image signal into a standard television signal and the like.

A signal division unit 110 divides a luminance signal (Y), and color difference signals (R−Y, B−Y) into predetermined small blocks. A chroma calculation unit 111 calculates chroma from color difference signals (R−Y, B−Y). A camera control unit 112 controls the whole of the image pickup system. A scene discrimination unit 113 discriminates the scene of an input photographed image, and a face detection unit 114 detects the face of a person from a photographed image.

Next, the processing operation of the image pickup apparatus 100 of FIG. 1 will be described. Light incident to the lens 101 is photoelectrically converted by the image pickup element 103, and the converted signal is amplified by the AGC amplifier 104 to an appropriate level to be output to the luminance and chrominance signal generation unit 105. The luminance and chrominance signal generation unit 105 generates a luminance signal (Y) and chrominance signals (R0, G0, B0) from an image signal output from the image pickup element 103, and outputs the chrominance signals (R0, G0, B0) to the white balance amplification unit 106.

The white balance amplification unit 106 amplifies the chrominance signals (R0, G0, B0) on the basis of the white balance gain calculated by the camera control unit 112, and outputs the amplified chrominance signals (R, G, B) to the color difference signal generation unit 107. The color difference signal generation unit 107 generates color difference signals (R−Y, B−Y) from the amplified chrominance signals (R, G, B), to output the generated color difference signals (R−Y, B−Y) to the color difference signal correction unit 108 and the signal division unit 110. The color difference signal correction unit 108 functions as an image processing unit, and multiplies the color difference signals (R−Y, B−Y) by a color difference gain G (G is one or more) calculated by the camera control unit 112 to correct the color difference signals (R−Y, B−Y). That is, each of the color difference signals {(R−Y)', (B−Y)'} after correction is:

$$(R-Y)'=G\times(R-Y) \text{ and}$$

$$(B-Y)'=G\times(B-Y).$$

Then, the color difference signal correction unit 108 outputs the color difference signals {(R−Y)', (B−Y)'} after correction to the encoder 109. In addition, the intensity of the color difference gain G will be described later. The encoder 109 generates a standard television signal, such as National Television System Committee (NTSC) signal, from a luminance signal (Y) and color difference signals (R−Y)', (B−Y)' after correction, and outputs the generated standard television signal to the outside.

Figure 2:
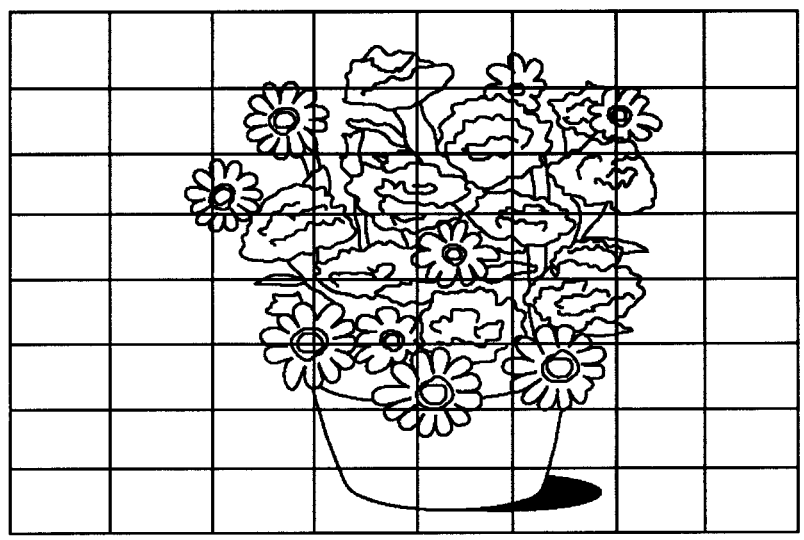
FIG. 2 is a view illustrating an example of a photographed image divided into 8×8 blocks.

The above describes the basic processing at the time of image pickup. Furthermore, the camera control unit 112 adaptively controls parameters to be used by the color difference signal correction unit 108 in accordance with the characteristics of image signals, so that the color difference signal correction unit 108 corrects the image signals. In the following, the analysis processing of the characteristics of an image signal will be described, The signal division unit 110 divides an image signal into the block (8×8 blocks) as illustrated in FIG. 2, and calculates the average values of the luminance signal (Y) and the color difference signals (R−Y, B−Y) in each block to output the results of the calculations to the chroma calculation unit 111. The chroma calculation unit 111 calculates the chroma of each block from the color difference signals (R−Y, B−Y). The chroma is calculated in conformity with the following formula (1).

$$\text{Chroma}=\sqrt{(R-Y)^2+(B-Y)^2} \quad (1)$$

Then, the chroma calculation unit 111 outputs the information of the calculated chroma of each block to the scene discrimination unit 113. On the other hand, the face detection unit 114 detects the face of a person, which is the main object, from a photographed image on the basis of the luminance signal (Y) output from the luminance and chrominance signal generation unit 105, and outputs the detection result of the face to the scene discrimination unit 113. When the face detection unit 114 detects the face of a person here, the face detection unit 114 also outputs the positional information of the face to the scene discrimination unit 113. In addition, various methods, such as the method of performing the pattern matching of luminance signals, have been conventionally proposed with regard to the recognition means for the face of a person, and any of them may be used.

The scene discrimination unit 113 discriminates whether the photographed image is such an image (vivid color scene) that is to be more largely weighted for chroma thereof or not, on the basis of the chroma of each block output from the chroma calculation unit 111 and a face detection result output from the face detection unit 114. In the following, the flow of the processing of the scene discrimination unit 113 will be described with reference to FIG. 3.

Figure 3:
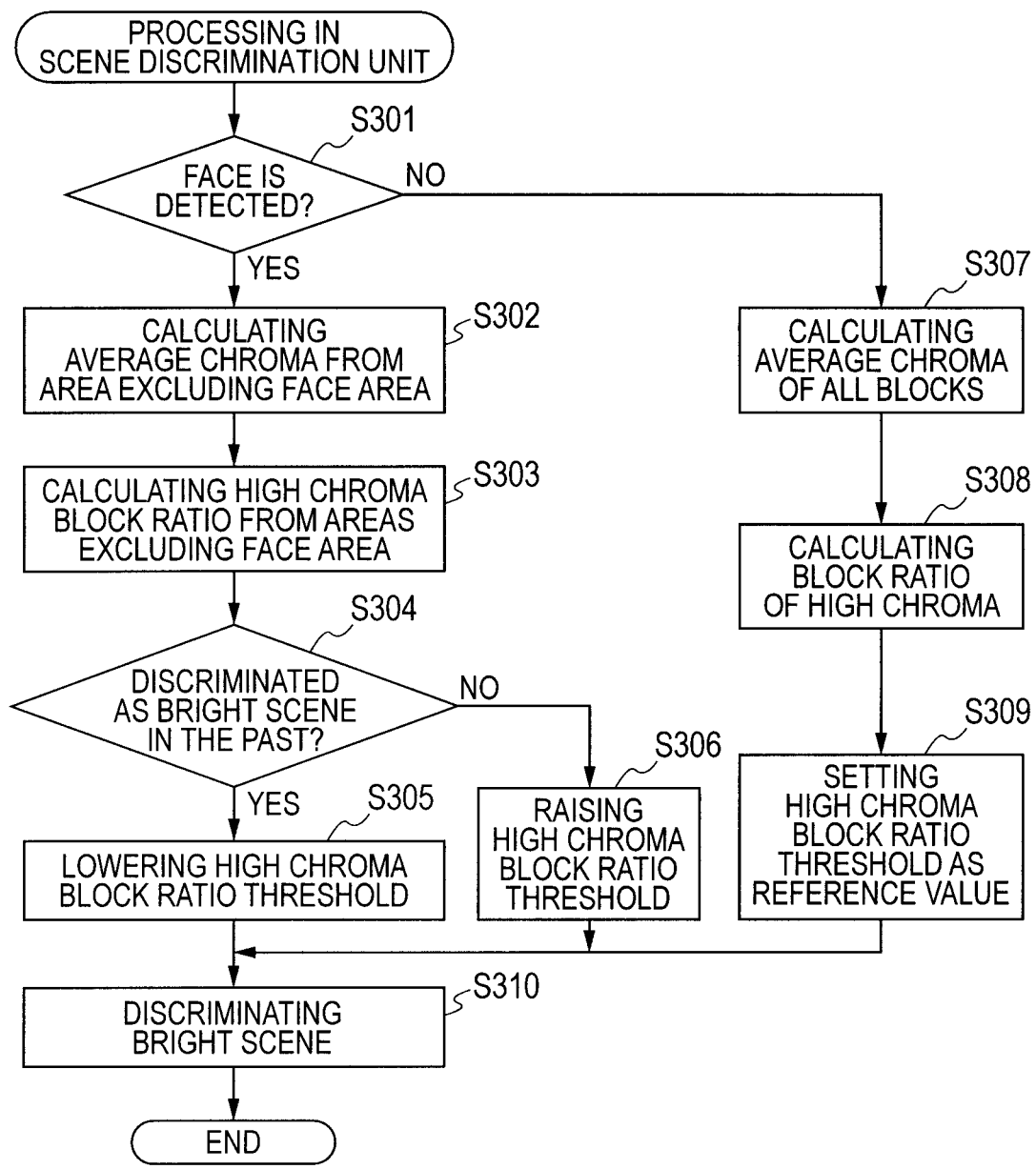
FIG. 3 is a flow chart illustrating an example of a vivid color scene discrimination processing procedure according to the first embodiment.

FIG. 3 is a flow chart illustrating an example of a vivid color scene discrimination processing procedure by the scene discrimination unit 113.

First, the scene discrimination unit 113 checks whether the face detection unit 114 has detected any face or not at Step S301 in FIG. 3. If the result of this check shows that the face detection unit 114 has detected a face, the scene discrimination unit 113 advances the vivid color scene discrimination processing to Step S302. If the face detection unit 114 has not detected any faces, the scene discrimination unit 113 advances the vivid color scene discrimination processing to Step S307.

Figure 4A:
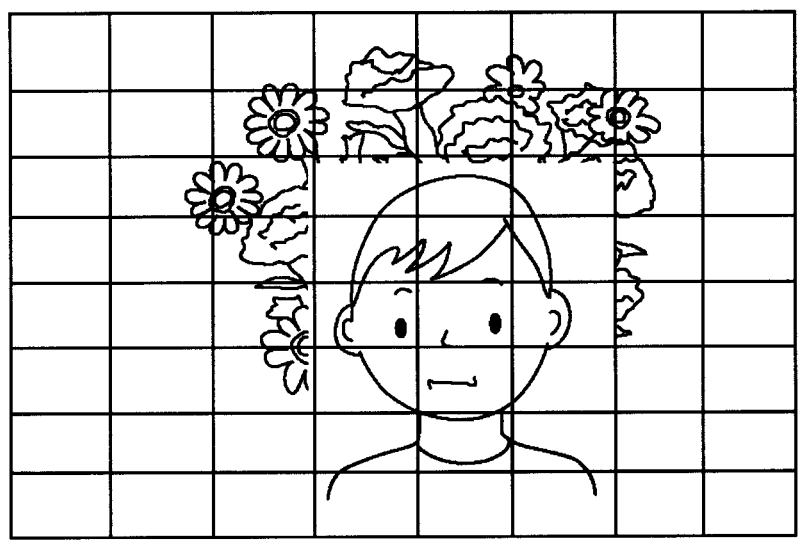
FIG. 4A is a views illustrating an example of a photographed image including a face area.

Then at Step S302, the scene discrimination unit 113 calculates average chroma from an image area other than a face area. This processing is described with reference to FIGS. 4A and 4B. FIG. 4A is a view illustrating an example of a photographed image including a face area therein. As illustrated in FIG. 4A, the scene discrimination unit 113 excludes the face area including the face, to calculate the average chroma, if the photographed image includes the face. At Step S302, the scene discrimination unit 113 calculates the average chroma of the blocks excluding those of a face area 401 as illustrated in FIG. 4B.

Figure 4B:
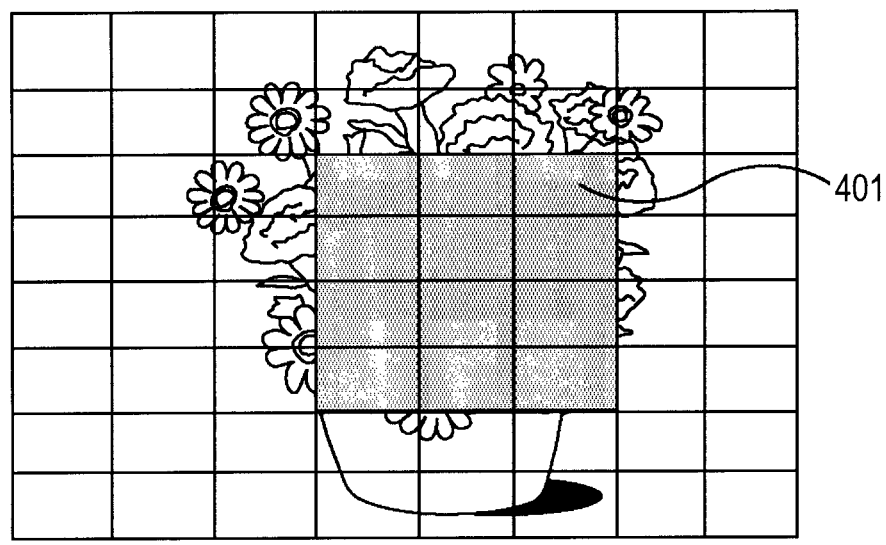
FIG. 4B is a view illustrating an example of a photographed image including a face area.

Next, at Step S303, the scene discrimination unit 113 calculates the number of blocks that have the chroma equal to or more than a predetermined threshold, among the blocks excluding a face area (for example, the face area 401 illustrated in FIG. 4B). Then, the scene discrimination unit 113 calculates the ratio (high chroma block ratio) of the number of blocks that have the chroma equal to or more than the predetermined threshold to the number of all the blocks excluding those of the face area (52 blocks in the examples of FIGS. 4A and 4B). Then, at Step S304, the scene discrimination unit 113 checks whether the scene was discriminated as the vivid color scene in the past or not by referring to past vividness discrimination results. Note that the scene discrimination unit 113 stores the discrimination result of the vivid color scene for a predetermined time before (for example, two seconds before), and performs discrimination on the basis of the stored past discrimination result at Step S304. If the result of this check shows that the scene was discriminated as the vivid color scene in the past, the scene discrimination unit 113 advances the vivid color scene discrimination processing to Step S305. If the scene was not discriminated as the vivid color scene in the past, then the scene discrimination unit 113 advances the vivid color scene discrimination processing to Step S306.

At Steps S305 and S306, the scene discrimination unit 113 determines a threshold At, which is one of the parameters for discriminating whether a scene is a vivid color scene or not, of the high chroma block ratio which the scene discrimination unit 113 has calculated at Step S303.

Figure 5A:
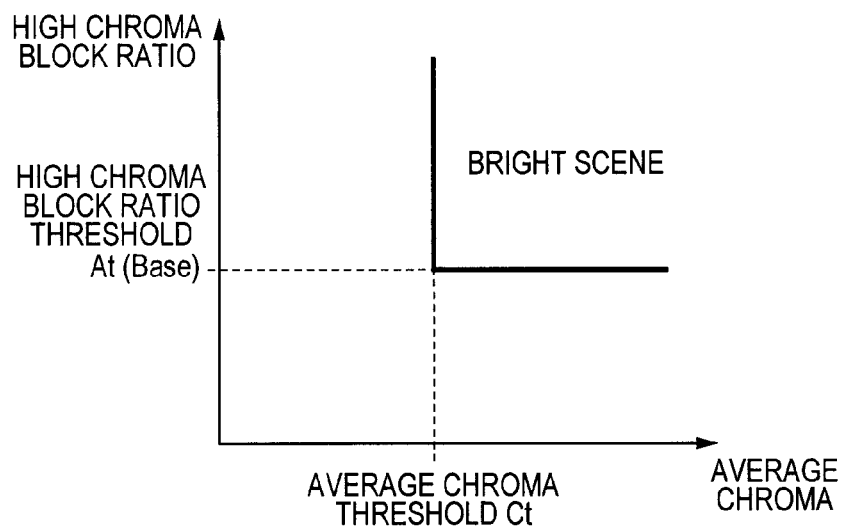
FIG. 5A is a diagram illustrating an example of a discrimination criterion of a vivid color scene according to the first embodiment.
Figure 5B:
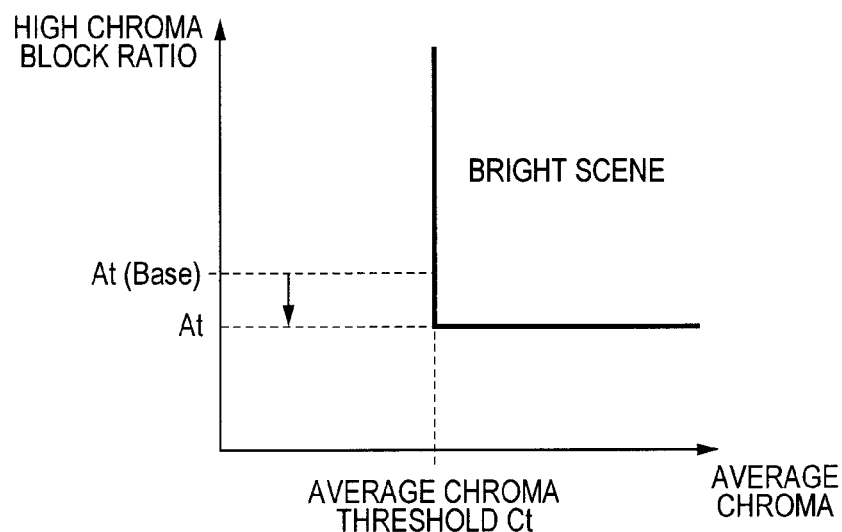
FIG. 5B is a diagram illustrating an example of a discrimination criterion of a vivid color scene according to the first embodiment.
Figure 5C:
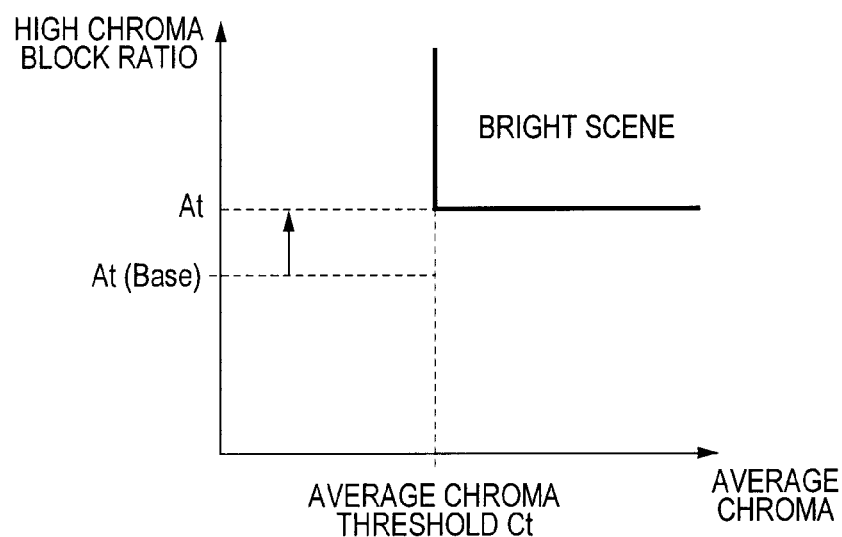
FIG. 5C is a diagram illustrating an example of a discrimination criterion of a vivid color scene according to the first embodiment.

FIGS. 5A to 5C are diagrams illustrating the examples of the discrimination criterions of vivid color scenes for average chroma and high chroma block ratios.

As illustrated in FIG. 5A, if the average chroma that the scene discrimination unit 113 has calculated at Step S302 is higher than average chroma threshold Ct, and if the high chroma block ratio that the scene discrimination unit 113 has calculated at Step S303 is larger than the threshold At, then the scene discrimination unit 113 discriminates that the scene is a vivid color scene at Step S310, the processing at which will be described later. The scene discrimination unit 113 determines the threshold At Steps S305 and S306.

At Step S305, the scene discrimination unit 113 loosens the discrimination criterion by lowering the threshold At of the high chroma block ratio to be smaller than a reference value At(Base). This state is illustrated in FIG. 5B. By performing such a procedure, in a case where the scene was discriminated as a vivid color scene in the past, the scene became easy to be discriminated as a vivid color scene even if the vivid object thereof is hidden by a face. On the other hand, at Step S306, the scene discrimination unit 113 raises the threshold At of the high chroma block ratio to be larger than the reference value At(Base), and makes the discrimination criterion severer. That is, if the scene was once discriminated as a vivid color scene in the past, the scene discrimination unit 113 loosens the discrimination criterion in comparison with the case where the scene is not discriminated as the vivid color scene.

This state is illustrated in FIG. 5C. By configuring in such a way, the discrimination of a scene to be a vivid color scene in the case the scene only includes a small vivid object in the areas other than those including a face can be prevented.

On the other hand, if the scene discrimination unit 113 has not detect any face as the result of the check at Step S301, the scene discrimination unit 113 calculates the average chroma over the all blocks (8×8 blocks) at Step S307. Next, at Step S308, the scene discrimination unit 113 calculates the number of blocks having the chroma that is equal to or more the predetermined threshold, among all the blocks. Then, the scene discrimination unit 113 calculates the ratio (high chroma block ratio) of the number of blocks having the chroma equal to or more than the predetermined threshold to the number of all the blocks (64 blocks in the examples of FIGS. 4A and 4B). Next, at Step S309, similarly to Steps S305 and S306, the scene discrimination unit 113 determines the threshold At of the high chroma block ratio, which is one of the parameters for discriminating whether a scene is a vivid color scene or not. Because the scene discrimination unit 113 has not detect any face, the scene discrimination unit 113 sets the reference value At(Base), illustrated in FIG. 5A, as the threshold At this step.

Then, at Step S310, as described above, the scene discrimination unit 113 discriminates whether a scene is a vivid color scene or not in accordance with the discrimination criterion of the vivid color scene, illustrated in FIGS. 5A to 5C. That is, if the average chroma calculated at Step S302 (or S307) is higher than the average chroma threshold Ct, and if the high chroma block ratio calculated at Step S303 (or S308) is larger than the threshold At, then the scene discrimination unit 113 discriminates that the scene is a vivid color scene.

The information as to whether the scene discrimination unit 113 has discriminated the scene as vivid color scene or not, in the processing procedure, is output to the camera control unit 112. The camera control unit 112 controls the parameters used by the color difference signal correction unit 108 on the basis of the information as to whether the scene is a vivid color scene discriminated by the scene discrimination unit 113 or not.

In the present embodiment, as described above, the camera control unit 112 controls the color difference gain G to be used by the color difference signal correction unit 108. As the color difference gain G, there are parameters G1 and G2, which are in the relation of G1>G2≥1. If the scene is discriminated as a vivid color scene here, the camera control unit 112 sets the color difference gain G to G1. If the scene is not discriminates as a vivid color scene, the camera control unit 112 sets the color difference gain G to G2. That is, if the scene is discriminated as a vivid color scene, the camera control unit 112 heightens the gain of the color difference signal to be higher and thereby corrects the scene to be an image in which chroma is emphasized.

As described above, according to the present embodiment, whether the scene is a vivid color scene or not is discriminated, and image processing is controlled in accordance with the discrimination result. To put it concretely, the face of a person is detected, and scene discrimination as to whether the scene is a vivid color scene or not is controlled to limit the influences of the area of the detected face. Thereby, a vivid color scene can suitably discriminated independent of the existence of a person in an input photographed image, and image processing of emphasizing chroma can be performed to any image including any vivid color scene.

In addition, although the case of detecting the face of a person has been exemplified to be described in the present embodiment, the present invention is not limited to this case. The present invention may detect anything, such as an animal and a plant. Moreover, in the present embodiment, the example of calculating the information, such as the average value of chroma, by excluding a face area in order to discriminate whether a scene is a vivid color scene or not has been described. On the other hand, any processing which may decrease the influences of a face area at the time of the discrimination of a vivid color scene may be performed. For example, the control of decreasing the influences of a face area at the time of calculating the average value of chroma by weighting the blocks corresponding to the face area (for example, the face area 401 illustrated in FIG. 4B) may be performed.

Moreover, although the threshold of the high chroma block ratio is changed according to the detection result of a face in the present embodiment, any parameter may be controlled for detecting a face as long as the parameter is for discriminating a vivid color scene. Moreover, the parameters for discriminating a vivid color scene are not limited to the two of the high chroma block ratio and the average chroma, but any conditions, any parameters, and any discrimination criterions may be used as long as they are the conditions set for discriminating a scene as a vivid color scene in accordance with a human sense.

Moreover, although the present embodiment prepares the color difference gains G (binary value) to be used by the color difference signal correction unit 108 for only two cases of being a vivid color scene and not being a vivid color scene, the color difference gains G are not limited to these cases. Moreover, if when a person is detected as the main object, a color difference gain is set to try to emphasize chroma similarly to the setting in the case where no person is detected, the skin color of a person is sometimes seem to an unnatural color. The degree of the correction of emphasizing vividness may accordingly be suppressed by reducing the weighting factor to chroma in the case where a person is detected in comparison with that in the case where no person is detected. That is, let the color difference gain G when a person is detected be G3, it is advantageous to set the G3 in order that the relation G1>G3>G2 may be concluded.

Moreover, although the processing of raising the chroma to emphasize the vividness of the image data discriminated to be a vivid color scene has been described in the present embodiment, the processing is not limited to this processing, but the present invention may also be applied to the processing of conversely lowering the chroma of a vivid color scene to suppress vividness. In this case, the gain may be set to, for example, G1<G2≤1. As described above, let the color difference gain G when a person is detected be G3, as a matter of course, G1<G3<G2.

Moreover, although the whole image data is equally multiplied by the color difference gain G set on the basis of a discrimination result of whether the image data is that of a vivid color scene or not in the present embodiment, the invention is not limited to such a method. Only the blocks (or pixels) having high chroma in image data may limitedly be multiplied by a color difference gain G higher than those of the other blocks.

Furthermore, although chroma has been calculated from the color difference signals (R−Y, B−Y) in conformity with the formula (1) in the present embodiment, the calculation method of the chroma is not limited to this method. For example, image data may be once converted into another space, such as an L*a*b* space, and chroma may be calculated in the L*a*b* space. Moreover, although the example of dividing an image signal into 8×8 blocks by the signal division unit 110 has been described in the present embodiment, any number of division may be adopted.

Moreover, although has been discriminated by using binary values in the present embodiment, the scene may be calculated by multi-valued values, such as the degree of vividness may be used to represent whether the scene is a vivid color scene or not. In this case, the degree of vividness is set to be higher as the average chroma becomes higher, or the high chroma block ratio becomes larger.

Figure 6:
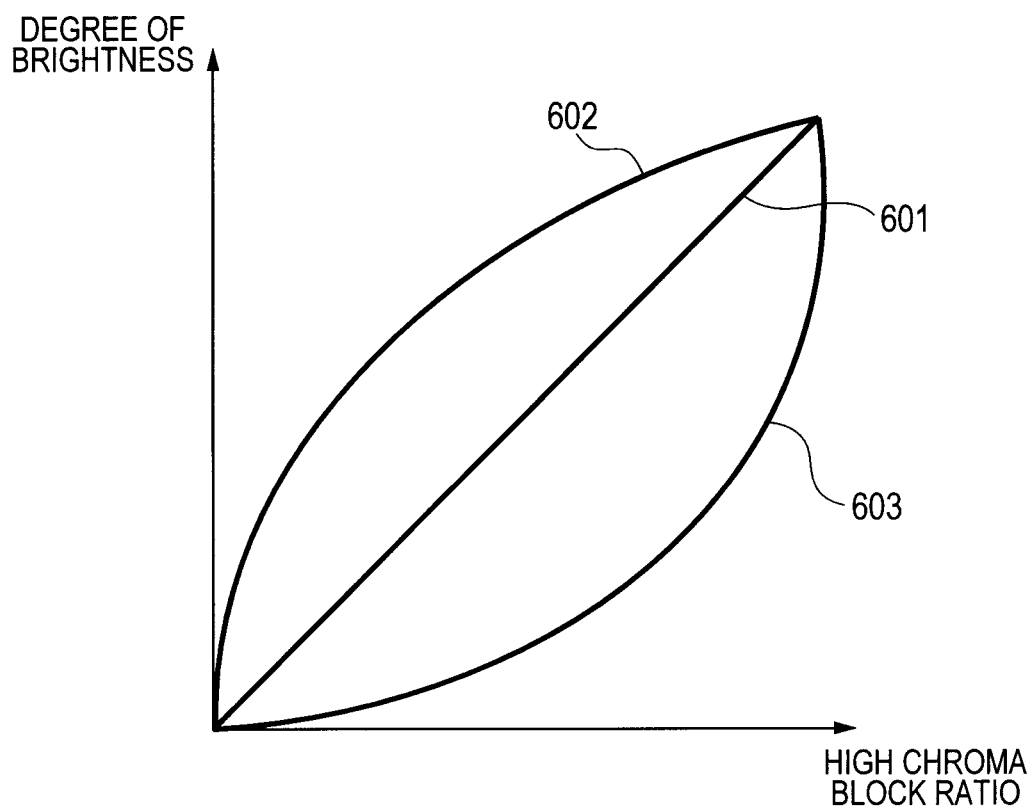
FIG. 6 is a diagram illustrating an example of the relation between the degrees of vividness and high chroma block ratios according to the first embodiment.

FIG. 6 is a diagram illustrating an example of a relation between the degrees of vividness and high chroma block ratios.

In FIG. 6, a reference characteristic 601 expresses a reference characteristic when no face is detected. On the other hand, the reference characteristic 601 is changed when a face is detected. For example, a characteristic 602 expresses a characteristic when a face is detected and the image data was discriminated as being vivid in the past. In this case, at Step S305 in FIG. 3, the characteristic 602 includes higher degrees of vividness than those in the reference characteristic 601. On the other hand, a characteristic 603 expresses the characteristic when a face is detected and the image data was not discriminated as being vivid in the past. In this case, at Step S306 in FIG. 3, the characteristic 603 includes lower degrees of vividness than those in the reference characteristic 601.

By performing the control mentioned above, even if a discrimination result of a vivid color scene is expressed by using not binary values but multi-valued values (degrees of vividness), the easiness of the discrimination of the vividness can be controlled on the basis of the existence of a face, and a vivid color scene can more suitably be discriminated.

Furthermore, the parameters for discriminating a vivid color scene may be controlled in accordance with the ratio of a face area to an image area including the face. For example, although the threshold At of the high chroma block ratio is described to be determined in the same way in accordance with a past discrimination result when a face is detected in the present embodiment, the threshold At may variably be determined in accordance with the ratio of a face occupying in an image. This method will be described with reference to FIGS. 7A and 7B.

Figure 7A:
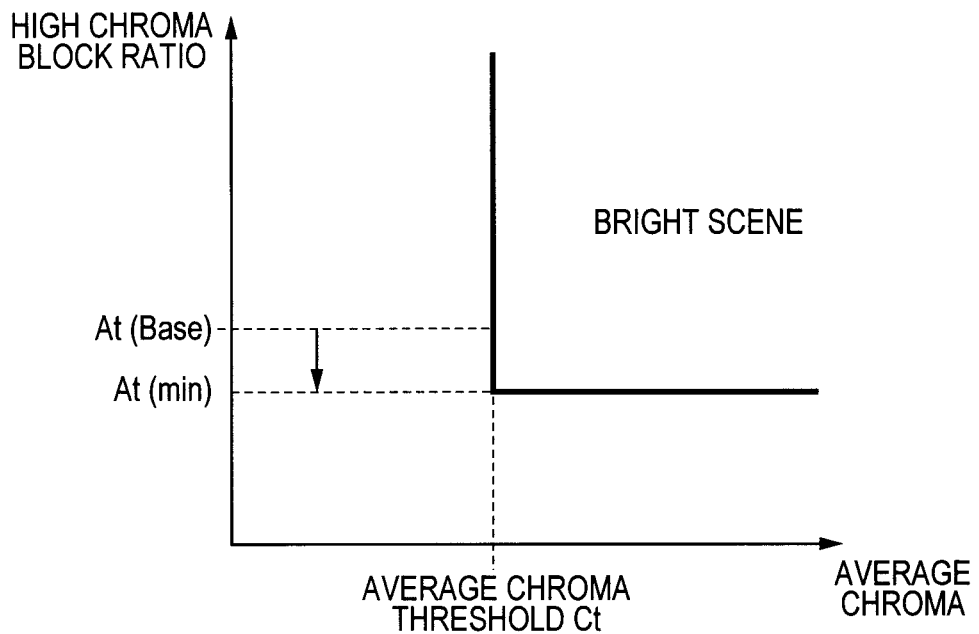
FIG. 7A is a diagram illustrating an example of discrimination criterion according to the ratio of a face in an image of the first embodiment.

FIG. 7A is a diagram illustrating an example of the threshold At of high chroma block ratios for discriminating a vivid color scene that was discriminated to be vivid in the past.

In FIG. 7A, At(min) denotes the maximum variation amount (the lower limit value of threshold) of the reference value At(Base). In the examples illustrated in FIGS. 7A and 7B, a value between the lower limit value At(min) and the reference value At(Base) is determined as the threshold At of the discrimination of a final vivid color scene on the basis of the ratio of a face to image.

Figure 7B:
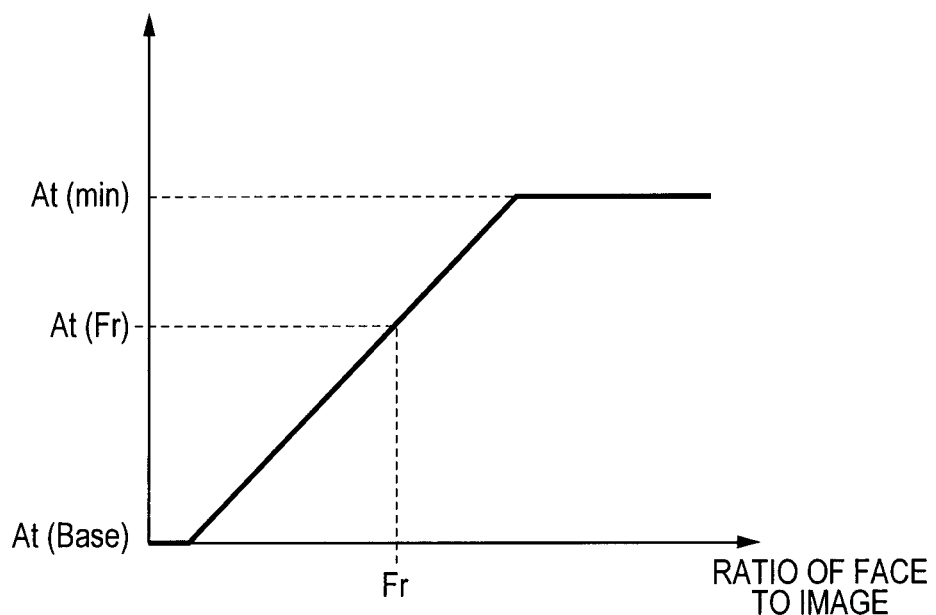
FIG. 7B is a diagram illustrating an example of discrimination criterion according to the ratio of a face in an image of the first embodiment.

FIG. 7B is a diagram illustrating an example of a relation between the ratio of a face to an image and the threshold At to discriminate a vivid color scene.

Figure 8A:
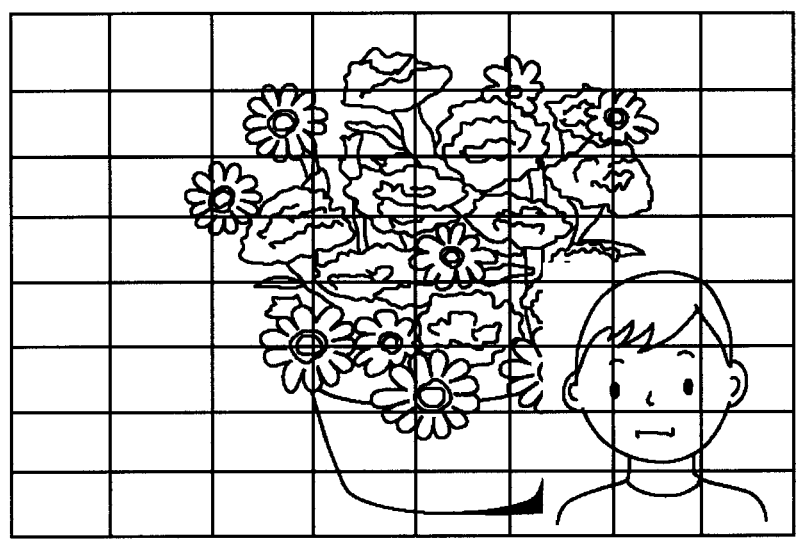
FIG. 8A is a view illustrating a photographed image including a certain ratio of a face image therein.
Figure 8B:
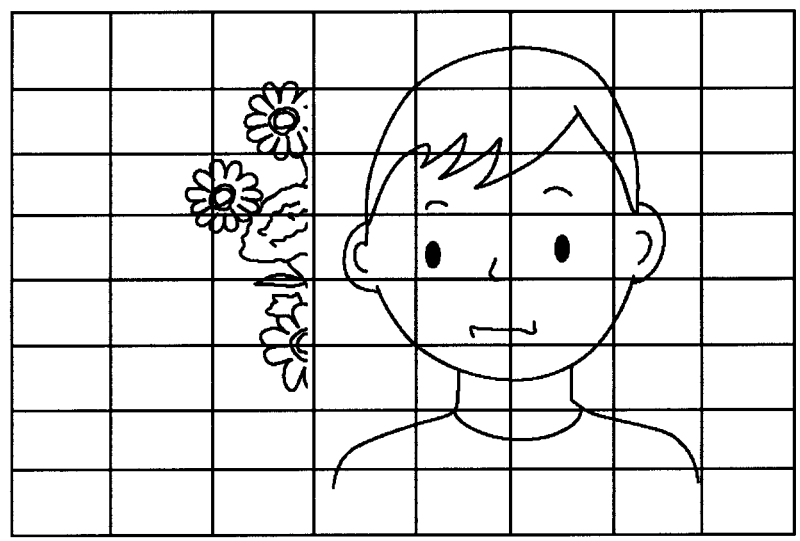
FIG. 8B is a view illustrating a photographed image including another ratio of the face image therein.

As illustrated in FIG. 7B, for example, if the ratio of a face to an image is Fr, the threshold At of a final high chroma block ratio is determined to At(Fr). For example, if the ratio of a face to an image is small as illustrated in FIG. 8A, even if a face is detected, then the detected face less affects the discrimination of a vivid color scene when the vivid color scene is discriminated. On the other hand, if the ratio of a face to an image is large as illustrated in FIG. 8B, the detected face more affects the discrimination of a vivid color scene when the vivid color scene is discriminated owing to the detection result of the face. The threshold At for the discrimination of a vivid color scene may accordingly be changed greatly from the reference value At(Base) as the area ratio occupied by the face to an image becomes higher.

Moreover, although the scene discrimination result of the scene discrimination unit 113 is made to be reflected to the image data used for the discrimination to be output in the present embodiment, the present invention is not specially limited to this way. That is, as a matter of course, it is possible to reflect the image processing in accordance with a discrimination result to a certain frame (image data), to the frames on and after the frame. Moreover, it is also conceivable to specify a scene from on the basis of the discrimination results of a plurality of frames, such that any scene is not specified until the discrimination results of vivid color scenes have been continued for a plurality of frames, or such that a scene is specified when the ratio of the discrimination of vivid color scenes is high among a plurality of frames. It is conceivable to reflect the image processing in accordance with the discrimination results to the plurality of frames and the frames on and after the frame. Moreover, at this time, the discrimination result to be used as a past discrimination result may be a discrimination result of the frame just before the frame of the discrimination object, or may be a discrimination result obtained from the plurality of frames situated just before the discrimination object.

As a concretely supposable situation, there is a situation in which processing is performed to a photographed image data (frame) in an information processing apparatus, such as an image pickup apparatus capable of still image photographing and a personal computer performing image processing to image data. Moreover, the aforesaid processing extending over a plurality of frames can be supposed in an information processing apparatus, such as an image pickup apparatus capable of live view display or moving image photographing and a personal computer performing image processing to a moving image.

Moreover, although the chroma of image data is corrected by using a discrimination result output by the scene discrimination unit 113 in the present embodiment, the using method of a discrimination result is not limited to such a correction. For example, it is also possible to inform a user of the discrimination result by displaying the not illustrated display unit, or to add the information corresponding to the display result to a header at the time of saving image data to enable a user to specify the photographed scene of the image data after the saving. Moreover, concerning a correction, vividness may be emphasized by correcting a factor other than chroma. For example, the correction raising luminance and the processing of emphasizing a contour can be considered as such processing.

Second Embodiment

Figure 10:
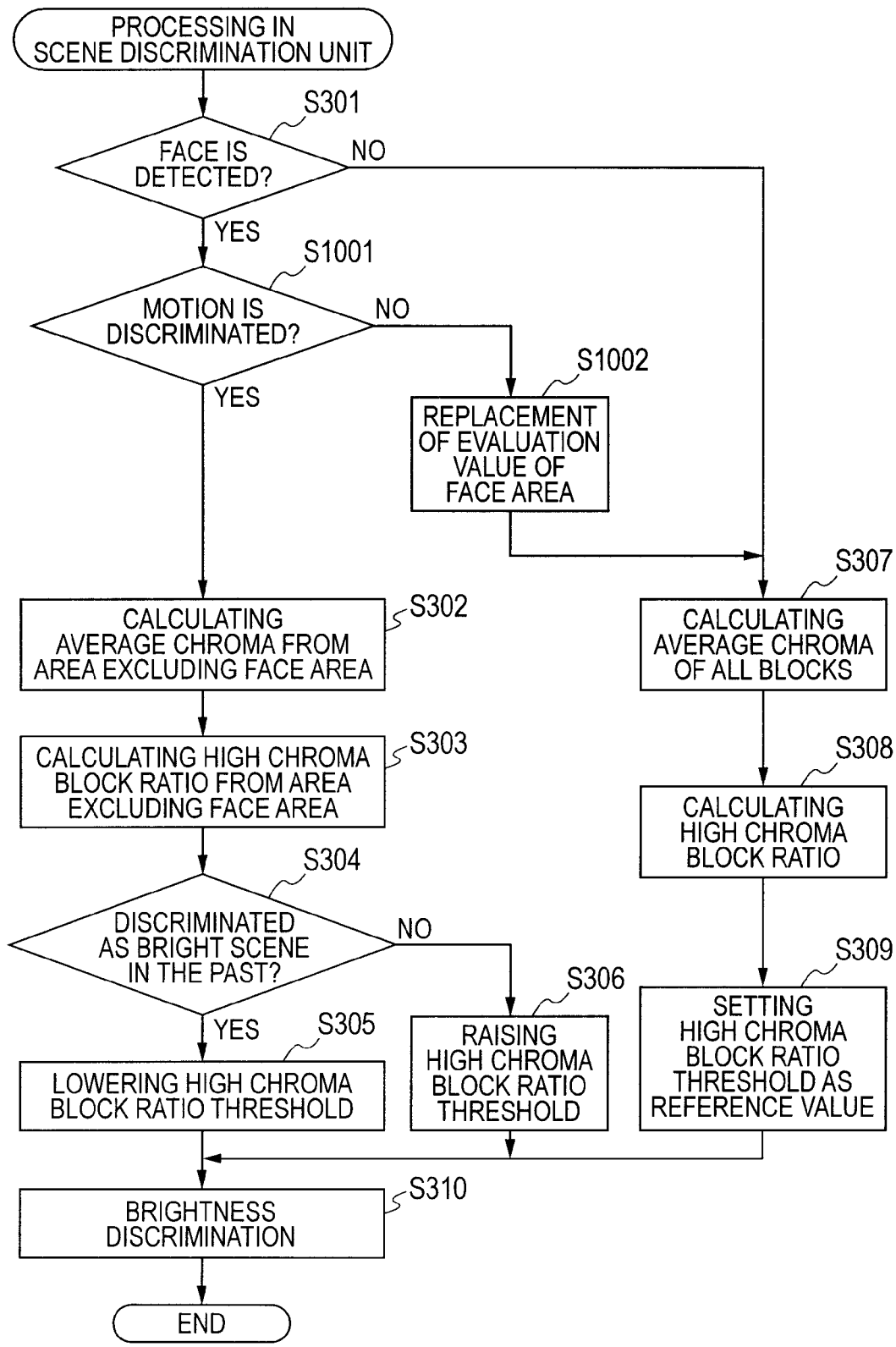
FIG. 10 is a flow chart illustrating an example of a vivid color scene discrimination processing procedure according to the second embodiment.
Figure 11:
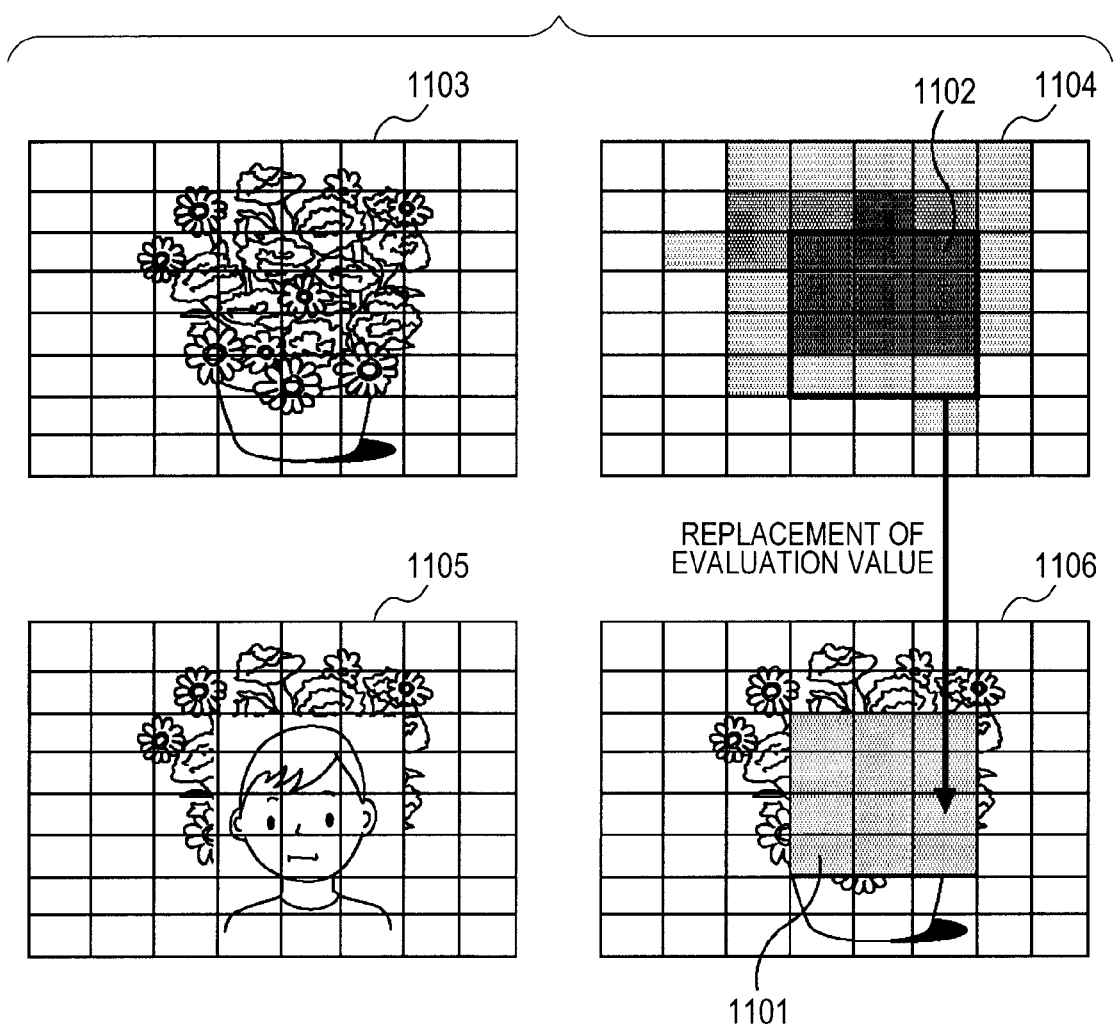
FIG. 11 is a view illustrating states of replacement of evaluation values according to the second embodiment.

In the following, an image pickup apparatus according to a second embodiment of the present invention will be described with reference to FIGS. 9 to 11. In the present embodiment, evaluation values, such as chroma, that have been hidden by the detection of a face are replaced with evaluation values detected in the past.

Figure 9:
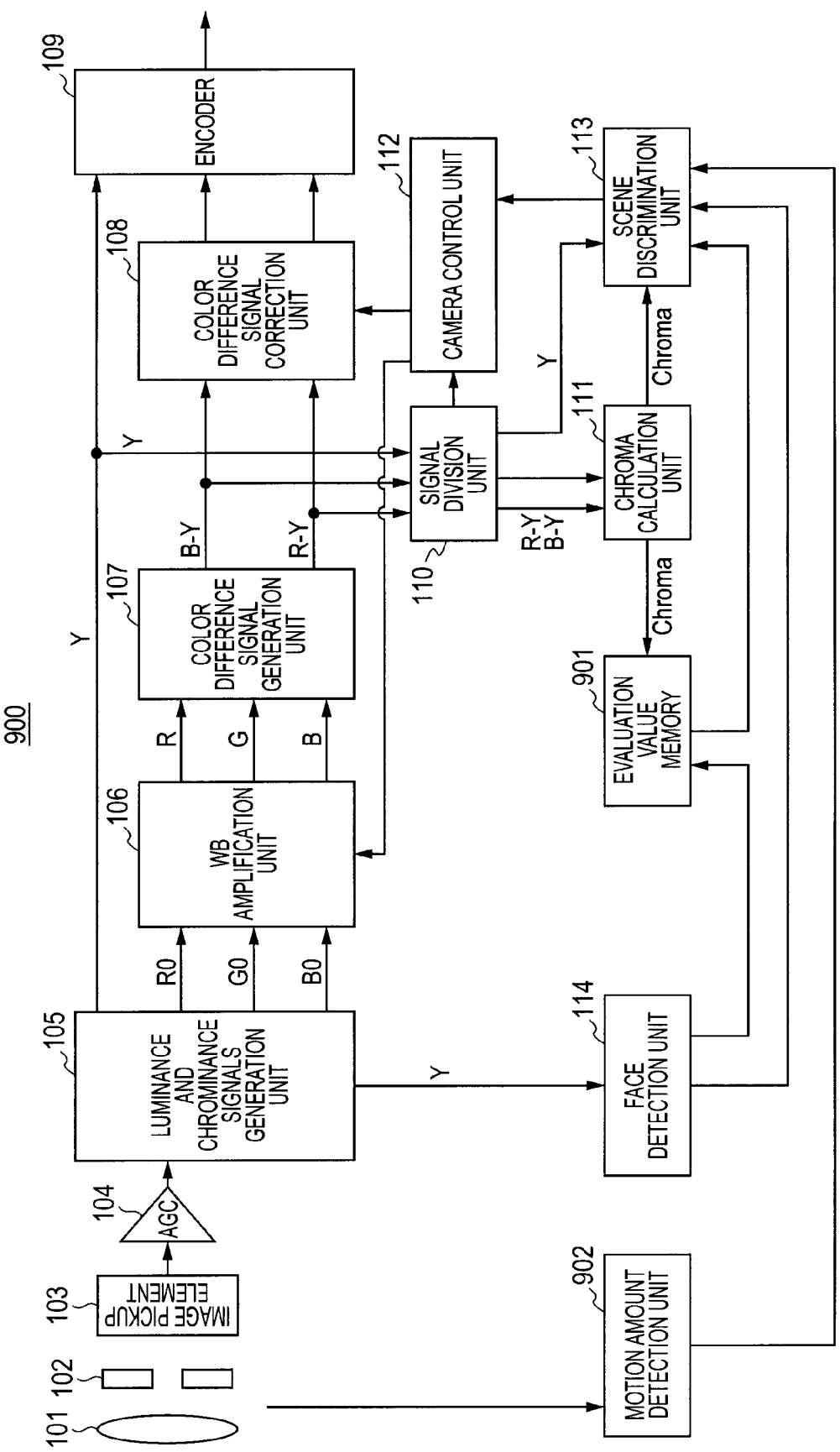
FIG. 9 is a block diagram illustrating a configuration example of an image pickup apparatus according to a second embodiment.

FIG. 9 is a block diagram illustrating a configuration example of an image pickup apparatus 900 according to the present embodiment. In addition, the blocks in FIG. 9 same as those in FIG. 1 are denoted by the same reference numerals as those of FIG. 1, and their descriptions are omitted. The present embodiment is further provided with an evaluation value memory 901 and a motion amount detection unit 902 in addition to the components of FIG. 1.

Next, the flow of the processing of the image pickup apparatus 900 illustrated in FIG. 9 will be described. The flow of the processing from photographing an image to outputting an image signal from the encoder 109 is similar to that of the first embodiment. Moreover, because the processing flows of the discrimination of a vivid color scene by the scene discrimination unit 113 and the control of the parameter to be used in the color difference signal correction unit 108 by the camera control unit 112 in accordance with the discrimination result are also similar to those of the first embodiment, the detailed descriptions of the flows are omitted. In the following, the respects different from those of the first embodiment will be described.

The signal division unit 110 calculates the average values of the luminance signal (Y) and the color difference signals (R−Y, B−Y) of each block similarly to the first embodiment, and outputs the calculated average values to the chroma calculation unit 111 as evaluation values. The chroma calculation unit 111 calculates the chroma of each block from the color difference signals (R−Y, B−Y) similarly to the first embodiment, and outputs the information of the calculated chroma to the evaluation value memory 901 and the scene discrimination unit 113.

The evaluation value memory 901 functions as a storage unit, and stores the information of the chroma of all blocks output from the chroma calculation unit 111 including the past information thereof. The processing of storing the information of chroma into the evaluation value memory 901 is here supposed to be performed at a predetermined time interval. However, if the face detection unit 114 has detected a face, the information of the chroma is not stored. The motion amount detection unit 902 calculates a motion amount from the zoom of the lens 101 and the vibration-proof information, and outputs the information of the calculated motion amount to the scene discrimination unit 113.

The scene discrimination unit 113 discriminates whether a scene is a vivid color scene or not on the basis of the information of the chroma calculated by the chroma calculation unit 111, the information of the chroma stored in the evaluation value memory 901, a face detection result by the face detection unit 114, and the information of the motion amount output from the motion amount detection unit 902.

In the following, the flow of the processing by the scene discrimination unit 113 will be described with reference to FIG. 10. FIG. 10 is a flow chart illustrating an example of the vivid color scene discrimination processing procedure by the scene discrimination unit 113. In addition, in FIG. 10, because the processing denoted by the reference numerals same as those of FIG. 3 are the processing similar to that described with regard to the first embodiment, the description thereof is omitted.

At Step S1001, the scene discrimination unit 113 discriminates whether the whole image is moving or not in accordance with the information of the motion amount output from the motion amount detection unit 902. That is, the scene discrimination unit 113 discriminates whether the motion amount output from the motion amount detection unit 902 is a predetermined value or more. If the motion amount is the predetermined value or more so that the whole image is moving as the result of the discrimination, then the scene discrimination unit 113 advances the processing to Step S302. In addition, the processing on and after Step S302 is similar to that of the first embodiment.

On the other hand, if the motion amount is smaller than the predetermined value so that the image does not move as the whole, as the discrimination result at Step S1001, then the scene discrimination unit 113 advances the processing to Step S1002. Then, at Step S1002, the scene discrimination unit 113 replaces the chroma of the detected face area with the chroma stored in the evaluation value memory 901. This processing will be described with reference to FIG. 11.

An image 1103 is an example of a photographed image including no faces. As described above, the information of the past chroma in the case of including no faces is stored in evaluation value memory 901. A chroma distribution 1104 illustrates that of the photographed image 1103 stored in the evaluation memory 901. In the chroma distribution 1104, the blocks illustrated by darker colors indicate that the blocks having higher chroma. A scene 1105 is an example of a scene in which the face of a person enters the scene (photographed image) 1103. A scene 1106 is an image in which a face area 1101 is illustrated in the scene 1105.

At Step S1002, the scene discrimination unit 113 replaces, for example, the chroma of the blocks included in the face area 1101 with a chroma distribution 1102 corresponding to the face area in the chroma distribution 1104 stored in the evaluation value memory 901. At Step S1002, by the replacement of the evaluation values in the face area, the influences of the face can be removed. Consequently, because the processing can be handled similarly to the case including no faces in the following processing, the scene discrimination unit 113 advances the processing to Step S307. Because the processing on and after Step S307 are similar to that described with regard to the first embodiment, the description thereof is omitted.

As described above, according to the present embodiment, if a face is detected, the evaluation values in the face area are replaced with the evaluation values in a past case where no faces were detected. By replacing the evaluation values in such a method, whether a scene is a vivid color scene or not can suitably be discriminated even if the object on the background is hidden by the face of the person. Thereby, the image processing of more emphasizing chroma can be performed to any image including a vivid color scene.

In addition, although the example of replacing the evaluation values in a face area with the past evaluation values at the time of including no faces has been described in the present embodiment, two groups of evaluation values may be combined to each other at a ratio corresponding to the motion amounts. Moreover, although the chroma has been exemplified as an evaluation value to be described in the present embodiment, any parameter may be used as the evaluation value to be replaced at the time of entering a face as long as the evaluation value is one to be used for discriminating a vivid color scene. Furthermore, although the motion amount detection unit 902 calculates a motion amount on the basis of the information of an optical system including the lens 101 and the like in the present embodiment, the calculation may be performed by any method as long as the method can calculate a motion amount. For example, the motion amount may be calculated by using an image signal besides the information of the optical system.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-295511, filed on Dec. 25, 2009 which is hereby incorporated by reference herein in its entirety.

What is claimed is:

1. An image processing apparatus, comprising:
an obtaining unit configured to obtain an image signal;
a calculator programmed to calculate evaluation values including at least chroma information on a basis of the image signal obtained by the obtaining unit, for each of several areas in an image represented by the image signal;
a detector that detects an object area from the image signal;
a discriminator that discriminates, with a processor, whether a scene of the image represented by the image signal is a vivid color scene or not, on a basis of a discrimination criterion and at least some of the evaluation values calculated by said calculator;
an output unit configured to output a discrimination result discriminated by said discriminator;
a storage unit configured to store a past evaluation value calculated by said calculator; and
a motion amount detection unit configured to detect a motion amount of an input image,
wherein said discriminator discriminates whether the image is vivid color or not by using the past evaluation value stored in said storage unit as an evaluation value of the object area detected by said detector if the motion amount detected by said motion amount detection unit is smaller than a predetermined value, and
wherein said discriminator loosens the discrimination criterion if the object area is detected by the detector as compared with the discrimination criterion in a case where the object area is not detected by the detector and if the scene of the image was discriminated as being vivid color in the past.

2. An image processing apparatus, comprising:
an obtaining unit configured to obtain an image signal;
a calculator programmed to calculate evaluation values including at least chroma information on a basis of the image signal obtained by the obtaining unit, for each of several areas in an image represented by the image signal;
a detector that detects an object area from the image signal;
a discriminator that discriminates whether a scene of the image represented by the image signal is a vivid color scene or not, on a basis of a discrimination criterion and at least some of the evaluation values calculated by said calculator; and
an output unit configured to output a discrimination result provided by said discriminator,
wherein said discriminator loosens the discrimination criterion if a past discrimination result shows that a scene of the image was discriminated as being vivid color as compared with the discrimination criterion in a case where the past discrimination result shows that a scene of the image was not discriminated as being vivid color.

3. The image processing apparatus according to claim 2, further comprising:
storage, arranged to store a past evaluation value calculated by said calculator,
wherein said discriminator discriminates whether the image is vivid color or not by using the past evaluation value stored in said storage as an evaluation value of the object area detected by said detector.

4. The image processing apparatus according to claim 3, further comprising:
a motion amount detector that detects a motion amount of an input image,
wherein said discriminator discriminates whether a scene of the image is vivid color or not by using the past evaluation value stored in said storage as the evaluation value of the object area detected by said detector if the motion amount detected by said motion amount detector is smaller than a predetermined value.

5. The image processing apparatus according to claim 2, wherein the object is a person.

6. The image processing apparatus according to claim 2, further comprising:
a correction unit configured to correct a chroma of the image signal on a basis of a criterion and at least some of the evaluation values calculated by said calculator.

7. The image processing apparatus according to claim 2, wherein said discriminator discriminates that the scene of the image of the image signal is a vivid color scene in a case where chroma information corresponds to a chroma value that is higher than a threshold value.

8. The image processing apparatus according to claim 2, wherein said discriminator comprises:
a dividing unit configured to divide the image into a plurality of blocks, and
wherein said discriminator discriminates that the scene of the image of the image signal is a vivid color scene in a case where a number of blocks, having a chroma larger than a threshold value, is larger than a threshold value.

9. An image processing apparatus, comprising:
an obtaining unit configured to obtain an image signal;
a calculator programmed to calculate evaluation values including at least chroma information on a basis of the image signal obtained by the obtaining unit, for each of several areas in an image represented by the image signal;
a detector that detects an object area from the image signal;
a discriminator that discriminates whether a scene of the image represented by the image signal is a vivid color scene or not, on a basis of a discrimination criterion and at least some of the evaluation values calculated by said calculator; and
an output unit configured to output a discrimination result provided by said discriminator,
wherein said discriminator loosens the discrimination criterion in accordance with a ratio of the object area detected by said detector to a whole of the image getting larger.

10. The image processing apparatus according to claim 9, further comprising:
a correction unit configured to correct a chroma of the image signal on a basis of a criterion and at least some of the evaluation values calculated by said calculator.

11. The image processing apparatus according to claim 9, wherein said discriminator discriminates that the scene of the image of the image signal is a vivid color scene in a case where chroma information corresponds to a chroma value that is higher than a threshold value.

12. The image processing apparatus according to claim 9, wherein said discriminator comprises:
a dividing unit configured to divide the image into a plurality of blocks, and
wherein said discriminator discriminates that the scene of the image of the image signal is a vivid color scene in a case where a number of blocks, having a chroma larger than a threshold value, is larger than a threshold value.

13. An image processing method, comprising the steps of:
calculating evaluation values including at least chroma information on a basis of an input image signal, for each of several areas in an image represented by the input image signal;
detecting an object area from the input image signal;
discriminating whether a scene of the image represented by the input image signal is a vivid color scene or not, on a basis of a discrimination criterion and at least some of the evaluation values calculated in said calculating step; and
outputting a discrimination result obtained in said discriminating step,
wherein said discriminating step includes loosening the discrimination criterion if a past discrimination result shows that the image was discriminated as being vivid color as compared with the discrimination criterion in a case where the past discrimination result shows that the image was not discriminated as being vivid color.

14. An image processing method, comprising the steps of:
calculating evaluation values including at least chroma information on a basis of an input image signal, for each of several areas in an image represented by the input image signal;
detecting an object area from the input image signal;
discriminating whether a scene of the image represented by the input image signal is a vivid color scene or not, on a basis of a discrimination criterion and at least some of the evaluation values calculated in said calculating step; and
outputting a discrimination result obtained in said discriminating step,
wherein said discriminating step includes loosening the discrimination criterion in accordance with a ratio of the object area detected in said detecting step to a whole of the image getting larger.

* * * * *